US006995359B1

(12) United States Patent
Hillenbrand et al.

(10) Patent No.: US 6,995,359 B1
(45) Date of Patent: Feb. 7, 2006

(54) MINIATURE CRYOGENIC SHUTTER ASSEMBLY

(75) Inventors: Eric A. Hillenbrand, Evansville, IN (US); Roy Luoma, Fallbrook, CA (US); R. Kyle Webb, Escondido, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 270 days.

(21) Appl. No.: 10/457,035

(22) Filed: Jun. 11, 2003

(51) Int. Cl.
   *G01N 21/35* (2006.01)
(52) U.S. Cl. .................................. 250/252.1; 250/351
(58) Field of Classification Search ............ 250/252.1, 250/351, 352
   See application file for complete search history.

(56) References Cited

U.S. PATENT DOCUMENTS

| | | | | |
|---|---|---|---|---|
| 3,169,189 A | * | 2/1965 | Barnes et al. ............... | 250/351 |
| 3,617,745 A | * | 11/1971 | Reed .......................... | 250/347 |
| 4,286,856 A | | 9/1981 | McGrath .................... | 354/234 |
| 4,592,083 A | | 5/1986 | O'Brien ..................... | 378/160 |
| 4,778,254 A | | 10/1988 | Gilliland, III et al. ...... | 350/269 |
| 4,799,767 A | | 1/1989 | Woodruff .................... | 350/269 |
| 4,880,293 A | | 11/1989 | Gilliland, III et al. ...... | 350/269 |
| 4,995,700 A | | 2/1991 | Barney et al. .............. | 350/266 |
| 5,128,796 A | | 7/1992 | Barney et al. .............. | 350/236 |
| 5,258,874 A | | 11/1993 | Bajat et al. ................. | 359/894 |
| 5,384,661 A | | 1/1995 | Geyer et al. ................ | 359/894 |
| 5,675,149 A | | 10/1997 | Wood et al. ................ | 250/332 |
| 5,994,701 A | * | 11/1999 | Tsuchimoto et al. ........ | 250/351 |
| 6,023,061 A | | 2/2000 | Bodkin ....................... | 250/332 |
| 6,875,979 B2 | * | 4/2005 | Cope .......................... | 250/252.1 |
| 2004/0135989 A1 | * | 7/2004 | Klebe .......................... | 356/3.06 |

FOREIGN PATENT DOCUMENTS

JP   02027224 A   *   1/1990

* cited by examiner

*Primary Examiner*—Constantine Hannaher
(74) *Attorney, Agent, or Firm*—Michael P. Stanley (57) ABSTRACT

A calibration method for radiometric imaging systems that relies on an absolute measurement of scene radiance (thereby requiring a baseline measurement of zero radiance), and a shutter assembly for taking the baseline measurement of zero radiance which is operable under cryogenic temperatures as low as 80.5K (−192.65° C.) in vacuums measuring $<10^{-6}$ torr (mm Hg). The shutter assembly generally includes an actuator and a shutter mechanism. The actuator is preferably a miniature solenoid assembly capable of operation in extreme environments (e.g. vacuums of $<10^{-6}$ torr, temperatures below 90K). The shutter mechanism preferably includes a single shutter blade and is also capable of operation when subjected to extreme environments. The method of using the shutter assembly provides a zero radiance reference measurement for an infrared imaging system, thereby providing a basis upon which absolute scene radiance may be determined.

1 Claim, 5 Drawing Sheets

MINIATURE CRYOGENIC SHUTTER ASSEMBLY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to infrared imaging system calibration methods and shutter mechanisms used therein and, more particularly, to a calibration method that relies on an absolute measurement of scene radiance (thereby requiring a baseline measurement of zero radiance), and a shutter mechanism operable under cryogenic conditions to measure zero radiance by providing the imaging system with a temporary view of some object possessing zero radiance.

2. Description of the Background

Infrared imaging systems are highly effective, surveillance and/or diagnostic tools. For example, their ability to "see" radiation wavelengths outside of the visible spectrum may be utilized to sense the movements of humans and animals in the dark (i.e. during nighttime hours), or to call attention to the imminent failure of a mechanical or electrical device by pinpointing the location of an inappropriate heat source. Infrared imagers are also sometimes used as radiometers, devices that measure the radiant output of a source. In such uses the imager must be calibrated in terms of absolute radiance units since radiometric imagers are often to understand the behavior of other infrared sensor types (infrared missile seekers, etc.), and these measure the total absolute scene radiance (that radiance arising from all sources external to the sensor system).

The measurement of absolute radiance is somewhat difficult and usually involves the measurement of a known reference source relative to the system under test. This is a relative measurement, but since it is tied to a reference source of known radiance, the absolute quantity may be evaluated. Specifically, absolute radiance can be measured by taking the difference between the scene radiance signal and the reference radiance signal, and assuming that the camera zeroth signal (the signal resulting from just the camera) is unchanging. This can work for a wide variety of measurements where the scene has either positive or negative contrast with the reference. However, the approach can lead to difficulty, since it is possible that for negative contrast cases the scene radiance signal can fall to the camera zero signal level without the operator being aware of it (it is, after all, an unknown quantity). It is also possible that for certain parametric configurations (gain states) the camera will not be able to encompass both radiance values (reference and target). In other words the camera runs out of dynamic range.

In light of the above, it would be better to have a calibration method that relied on camera characteristics alone to make the measurement, e.g., relying on an absolute measurement of scene radiance (thereby requiring a baseline measurement of zero radiance). This approach has not heretofore been pursued because to effectively implement it the imaging system must be provided with a temporary view of some object possessing zero radiance. To create the temporary view, an object that possesses zero radiance must temporarily fill the field-of-view of the focal plane array of the imager. This requires a shutter mechanism that moves in front of the imaging system aperture, then returns to a non-occluding position, under cryogenic conditions.

Camera shutter mechanisms are well-known, but to effectively maintain an object with "zero" radiance the temperature must be very low and the shutter must be a "cold shutter." Specifically, to effectively remove all radiance from an object in the midwave (3–5 μm) and long wave (8–12 μm) bands that typical imaging systems operate in, that object's temperature must be below 90K (−183° C.). While temperatures of that magnitude may be achieved by applying liquified, or nearly-liquified, gas to the object, or by placing the object in interplanetary space (which also exposes the object to a nearly perfect vacuum), conventional camera shutter mechanisms do not function in such environments.

The present inventor is not the first to address the need for shutter assemblies, or apparatus designed to open and close the aperture of an optical instrument, that are operable when subjected to cryogenic conditions (e.g. very low component temperatures). Other examples of shutter mechanisms possessing these attributes may be found in U.S. Pat. No. 5,384,661 to Geyer et al., U.S. Pat. No. 5,258,874 to Bajat et al., and U.S. Pat. Nos. 5,128,796 and 4,995,700 to Barney et al.

U.S. Pat. No. 5,384,661 to Geyer et al. discloses an articulated device for space vehicles for temporarily sealing the aperture of a space-based optical instrument. The device includes a fixed support element for mounting on the vehicle and an auxiliary element such as a temporary sealing flap mounted to pivot with respect to the fixed support element around a hinge axis between a first configuration (e.g. wherein the aperture is sealed) and a second configuration. The auxiliary element is attached, by a frangible controlled-break component for making temporary connections, to a hinge shaft whose rotation between the first and second configuration is controlled by an actuator. A torsional resilient return device is secured to the auxiliary element and to the shaft while resiliently biasing the auxiliary element to rotate it around the shaft in a predetermined direction. The shaft is substantially loosely engaged in journal bearings that are rigidly fastened to the auxiliary element.

U.S. Pat. No. 5,258,874 to Bajat et al. discloses a device for movement control of a mobile element that moves with respect to a support between two extreme positions. The invention includes an arm that pivots around a rotation axis which supports the mobile element; an elastic torsion rod aligned along the axis, secured respectively to the arm and to the support at axially offset points; two mechanical stops mounted on the support which determine two extreme angular configurations of the arm in which the element is in its extreme positions, the elastic torsion rod tending to bring the arm into a predetermined one of these configurations; two pair of complementary magnetic latching elements mounted either on the support or on the arm, the complementary units of either pair being adapted to be opposite when the arm is in one or the other of the extreme configurations; and launching members mounted on the support designed to give a launching impetus to the arm from each to the other of the extreme configurations.

U.S. Pat. Nos. 5,128,796 and 4,995,700 to Barney et al. disclose magnetically operated shutter mechanisms that will function in cryogenic or cryogenic zero gravity environments to selectively block radiation such as light from passing through a window to a target object such as a mirror or detector located inside a cryogenic container such as a Dewar. The mechanism includes a shutter paddle blade that is moved by an electro-magnetically actuated torquing device between an open position where the target object is exposed to ambient radiation or light, and a closed position where the shutter paddle blade shields the ambient radiation or light from the target object. The purpose of the shuttering device is to prevent the mirror or other target object from being directly exposed to radiation passing through the window located on the side wall of the Dewar, thereby decreasing or eliminating any temperature gradient that would occur within the target object due to exposure to the radiation. A special nylon bearing system is utilized to prevent the device from binding during operation and the paddle blade is also thermally connected to a reservoir containing the cryogen to further reduce the internal temperature.

Unfortunately, each of the above-described, prior art devices is relatively large and complex, and is not adaptable for use in small or medium format cryogenically cooled infrared cameras. Moreover, the prior art mechanisms appear to be prone to temperature variations which would affect their ability to remain fully functional in extreme environments.

There remains a significant need for a cryogenic shutter mechanism that, when actuated, provides the infrared radiation sensor (imaging system) with a view of a very low temperature surface in order to calibrate the zero radiation reference level in the imaging system. To the best of the knowledge of the present inventors, no such apparatus exists, and no one has endeavored to implement a calibration method that relies on an absolute measurement of scene radiance (thereby requiring a baseline measurement of zero radiance using a cryogenic shutter mechanism as described to provide the imaging system with a temporary view of some object possessing zero radiance).

SUMMARY OF THE INVENTION

It is, therefore, an object of the present invention to provide an improved infrared imaging system shutter assembly that operates reliably when subjected to cryogenic conditions.

It is another object of the present invention to provide a cryogenic infrared imaging system shutter assembly that, when actuated, provides the infrared imaging system with a view of a very low temperature (i.e. "zero radiance") surface.

It is another object of the present invention to provide a cryogenic infrared imaging system shutter assembly that operates in a sliding guillotine fashion to minimize the effect of extreme temperature variations.

It is still another object of the present invention to provide a cryogenic infrared imaging system shutter assembly that requires a minimal voltage pulse for actuation.

It is another object of the present invention to provide a cryogenic infrared imaging system shutter assembly that is very small in physical size and lightweight, and which is fabricated of strong, lightweight materials for optimum durability and longevity, and yet which is economical to manufacture.

Yet another object of the present invention is to provide an infrared imaging system calibration method that relies on an absolute measurement of scene radiance (thereby requiring a baseline measurement of zero radiance using the above-described cryogenic shutter assembly to provide the imaging system with a temporary view of some object possessing zero radiance).

These and other objects are accomplished by a miniature cryogenic shutter assembly, operable at temperatures as low as 80.5K (−192.65° C.) in vacuums measuring <$10^{-6}$ torr (mm Hg), for use in infrared imaging systems. The present invention generally comprises an actuator and a shutter mechanism. The actuator is preferably a miniature solenoid assembly capable of operation on a voltage pulse of between 8–28 VDC even when subjected to extreme environments (e.g. vacuums of <$10^{-6}$ torr, temperatures below 90K). The shutter mechanism preferably includes a single shutter blade and is also capable of operation when subjected to extreme environments. Upon application of an appropriate voltage pulse, the shutter blade is moved into position in front of the infrared radiation sensor (i.e. occluding the infrared imaging system's aperture). When the voltage pulse is removed, a spring returns the shutter blade to its original position, reopening the imaging system's aperture.

The miniature cryogenic shutter assembly of the present invention provides a "zero radiance" reference measurement for an infrared imaging system, thereby allowing absolute scene radiance to be determined. The present invention is compact enough to fit small/medium-sized infrared imaging systems and is designed to operate in a vacuum and at extremely low temperatures (e.g. interplanetary space). The present invention is fabricated of a variety of strong, lightweight materials to provide the durability/longevity required by the nature of its usage. Its design is simple and straightforward, and can be economically manufactured.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

In accordance with the method of the present invention, a method of calibrating an infrared imaging system is disclosed in which a miniature cryogenic shutter assembly is used to provide a zero radiance reference measurement, thereby allowing absolute scene radiance to be determined.

Figure 1:
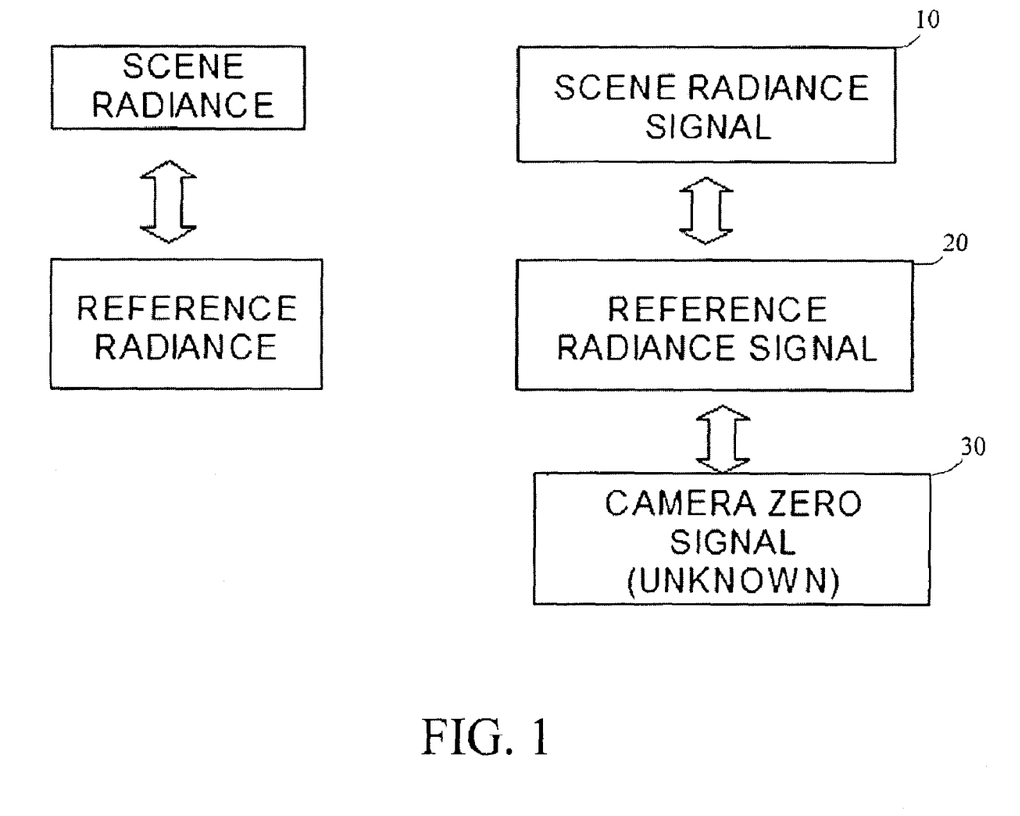
FIG. 1 is a block diagram of the absolute radiance measurement method according to the present invention.

FIG. 1 is a block diagram of the absolute radiance measurement method according to the present invention that can be practiced when calibrating any existing infrared imaging system. The absolute radiance measurement generally includes the illustrated steps of: 10) using the infrared imaging system to measure a scene radiance signal; 20) using the infrared imaging system with cryogenic shutter assembly (to be described) to measure a baseline zero radiance signal; and 30) taking the difference between the scene radiance signal and the baseline zero radiance signal while assuming that the camera zeroth signal (the signal resulting from just the camera) is unchanging. The measured difference becomes the calibration factor by which the infrared imaging system is calibrated. In accordance with the present invention, the baseline measurement of zero radiance is taken using the cryogenic shutter assembly to provide the imaging system with a temporary view of some object possessing zero radiance. To create the temporary view, an object that possesses zero radiance must temporarily fill the field-of-view of the focal plane array of the imager. This can be achieved by the shutter mechanism as it moves in front of the imaging system aperture, then returns to a non-occluding position.

Figure 2:
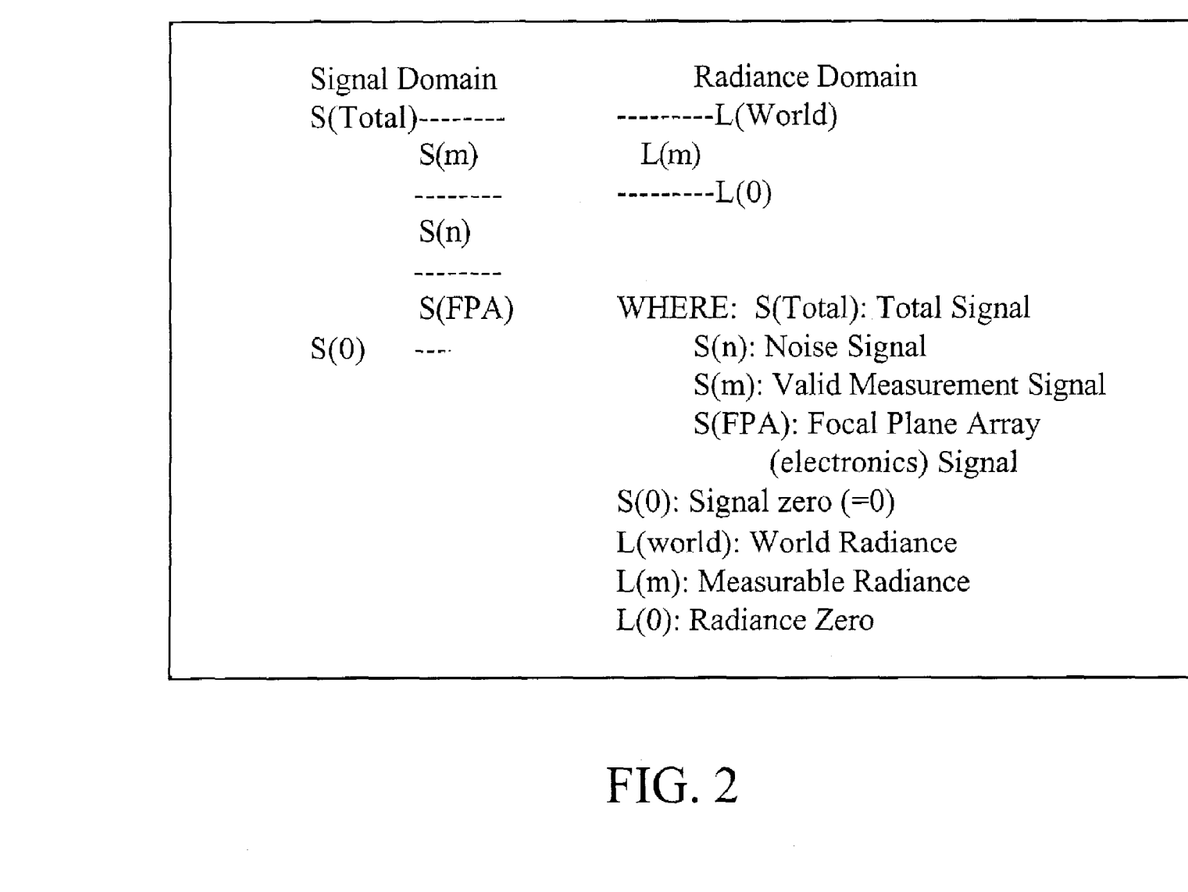
FIG. 2 is a graphical representation the absolute measurement scheme in accordance with the present invention.

The absolute radiance measurement will now be described in more detail with reference to FIG. 2, which, is a graphical representation the absolute measurement scheme in accordance with the present invention.

To accomplish the absolute measurement, it is assumed that:

$$S \propto L$$

i.e. that the signal coming out of the camera is in some way proportional to the input radiance. Next, a radiometric gain factor is defined, so that $$S*R=L \quad (1)$$

Assume $L(0)/L(n)=S(n)*R$, where $L(n)$ is the noise equivalent radiance.

So, $$S(m)=S(\text{Total})-(S(FPA)+S(n)) \quad (2)$$

$$L(m)=L(\text{World})-L(n) \quad (3)$$

Where $S(m)$ is the valid measurement signal, $S(\text{total})$ is the total signal from the instrument, $S(FPA)$ is the signal arising from the instrument when the irradiance of the focal approaches 0 and $S(n)$ is the contribution to the instrument signal which arises from all noise sources (shot, photon, etc.). $L(m)$ is the measurable radiance, $L(\text{world})$ is the total radiance of all sources external to the focal plane and $L(n)$ is the radiance analogue of the instrument noise.

Substituting equations (2) and (3) into (1) yields, $$(S(\text{Total})-(S(FPA)+S(n)))*R=L(\text{World})-L(n) \quad (4)$$

Rearranging equation (4) yields the following:

$$(S(\text{Total})-(S(FPA)+S(n)))*R+L(n)=L(\text{World}) \quad (5)$$

If it is assumed that $L(\text{World})=L(\text{Scene})+L(\text{Optics})$, this can be substituted into equation 5 to yield:

$$(S(\text{Total})-(S(FPA)+S(n)))*R+L(n)=L(\text{Scene})+L(\text{Optics}) \quad (6)$$

Then, rearranging equation (6) yields the following:

$$(S(\text{Total})-(S(FPA)+S(n)))*R+L(n)-L(\text{Optics})=L(\text{Scene}) \quad (7)$$

or $$(S(\text{Total})-(S(FPA)+S(n)))*R+L(n)-L(\text{Scene})=L(\text{Optics}) \quad (8)$$

In practicing the method, equations 7 and 8 are the ones used in actually reducing data from radiometric imagers, but to use them it is necessary to evaluate all the terms. The evaluation of $S(\text{Total})$ and $S(0)$ are obvious, but the evaluation of the other terms is less so.

i. Evaluation of $S(FPA)$

The zero point of the focal plane is the most critical number to know since it establishes the reference point of the system. This number is simple to measure, but requires that the camera be equipped with a cold shutter in accordance with the apparatus of the present invention (as will be described). The cold shutter is mounted to the camera's cold finger so that it is at a very low temperature (<90K) and thus has effectively zero radiance (within the typical 3–5 $\mu$m bandpass of a midwave infrared imager this value will be ~$9\times10^{-15}$W/sr cm$^2$ @90K). This shutter is used to occlude the focal plane and $S(FPA)$ is measured. This shutter may be actuated either remotely via an actuator (motor or solenoid) or manually.

ii. Evaluation of $S(n)$

The noise signal $S(n)$ is somewhat more difficult to define, but an obvious if somewhat simplistic method is to statistically evaluate a scene of uniform radiance and select some sigma multiple to be the noise level. This is done by presenting a source of uniform (but not necessarily known) radiance to the imager, which completely fills the field of view (FOV) and performing a measurement. Other methods which involve statistical evaluation of the noise of a scene can also be used.

iii. Evaluation of R

The evaluation of the radiometric gain R of the system is a straightforward radiometric calibration procedure. For a given parametric configuration (gain state) radiometric imagers are well behaved with respect to frame integration time, so it is best to calibrate at an integration time that yields a good signal/noise (S/N) for the available calibration source, even if the measurement is to be performed with a different integration time. It is necessary, however, to be aware that if calibrating with relatively low radiance standards that extraneous factors (path radiance, optics radiance, etc.) can affect the accuracy of the calibration.

One way to avoid the foregoing problem for any calibration is to do a differential calibration. In the differential calibration method, the following can be assumed:

$$\text{Signal(Source)} \alpha \text{Radiance(Source)}+\text{Radiance(path)}+\text{Radiance(Optics)} \quad (9)$$

and $$\text{Signal(Reference)} \alpha \text{Radiance(Reference)}+\text{Radiance(path)}+\text{Radiance(Optics)} \quad (10)$$

Eliminating terms and rearranging yields:

$$\text{Signal(Source)}-\text{Signal(Reference)} \alpha \text{Radiance(Source)}-\text{Radiance(Reference)} \quad (11)$$

and R is defined as $$\text{Radiance(Source)}-\text{Radiance(Reference)}/\text{Signal(Source)}-\text{Signal(Reference)} \quad (12)$$

iv. Evaluation of $L(n)$ $L(n)$ can be evaluated empirically, and conceptually it is easiest to think of it as the point where the camera "turns on". However, this number is defined as $S(n)\times R$.

v. Evaluation of L(Optics)

An accurate evaluation of the optics radiance is critical for the measurement of low radiance targets (sky, trees, birds, bees, etc.). In accordance with the present method, we fill the field with a scene of zero radiance using a "null cavity blackbody", e.g., an emitter cup submerged in a liquid nitrogen bath. A shutter closes the cavity when the source is not in use and a nitrogen bleed system keeps the cavity purged with dry nitrogen. In use, the source is mated to the camera using a foam adapter ring and the shutter is lifted and the measurement is taken. This process takes less than 10 seconds. One advantage of this system is that the emitter surface is at approximately −196EC. At this temperature uncertainties in surface emissivity and temperature become fairly meaningless.

vi. Cyclic Integration

At a given integration time and gain state, even the best radiometric imagers have a limited dynamic range. For example the Santa Barbara Focal Plane SBF125 InSb camera can handle changes in scene radiance of about a factor of 350. An automatic gain control (AGC) system, even if practical, would be of limited utility since as sudden increase in the radiance of a scene segment would result in the loss of information about dimmer segments in the scene. A much better method for achieving a large dynamic range is to sacrifice frame frequency. Several integration time steps are stored in the camera and cycled through on a frame-by-frame basis, this process is called cyclic integration or "superframing", a term coined by Santa Barbara Focal Plane. A Superframe consists of 2 or more subframes and is constructed by merging. For example, a camera may have a total frame rate of 120 Hz and be capable of supporting 4 integration times; such a camera would have a Superframe rate of 30 Hz.

The equations 7 and 8 discussed above are especially suited for supporting Superframe cameras. Since these cameras render all frames in absolute radiance units the segmentation and combination of individual subframes is algorithmically trivial, all the operator needs to know are the radiance limits for the individual integration times, quantities that are easily measurable during the calibration process. Such a method for 3 subframes results in an increase in dynamic range from a factor of 350 to approximately 500,000 at a frame rate of 100 Hz (Superframe rate of 33 Hz).

Figure 3:
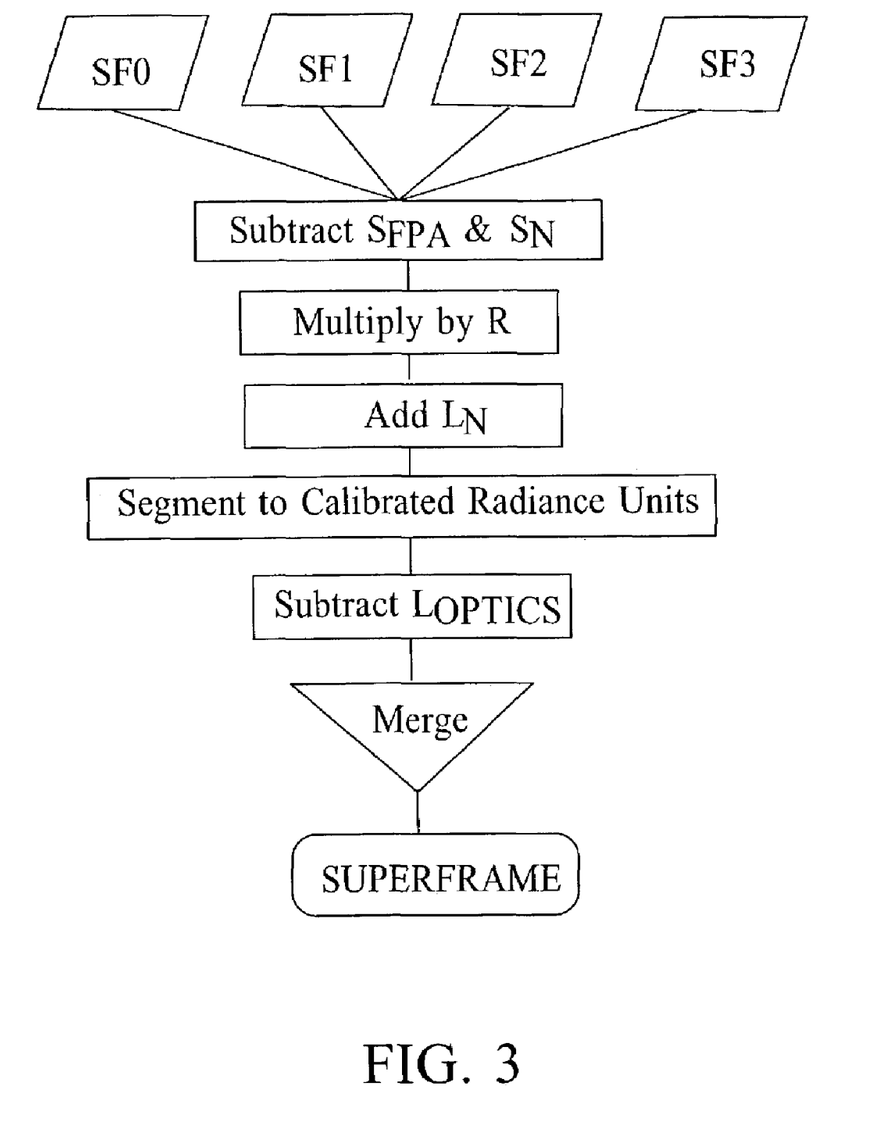
FIG. 3 is a flowchart detailing the steps involved in generating a Superframe from 4 subframes.

The flowchart in FIG. 3 details the steps involved in generating a Superframe from 4 subframes. The individual frames have been gain and offset normalized for pixel non-uniformity before entering the data stream.

As stated above, the zero point of the focal plane S(FPA) establishes the reference point of the system. This number requires that the camera be equipped with a cold shutter in accordance with the apparatus of the present invention. The cold shutter is mounted to the camera's cold finger so that it is at a very low temperature (<90K) and thus has effectively zero radiance. This shutter is used to occlude the focal plane and S(FPA) is measured.

Figure 4:
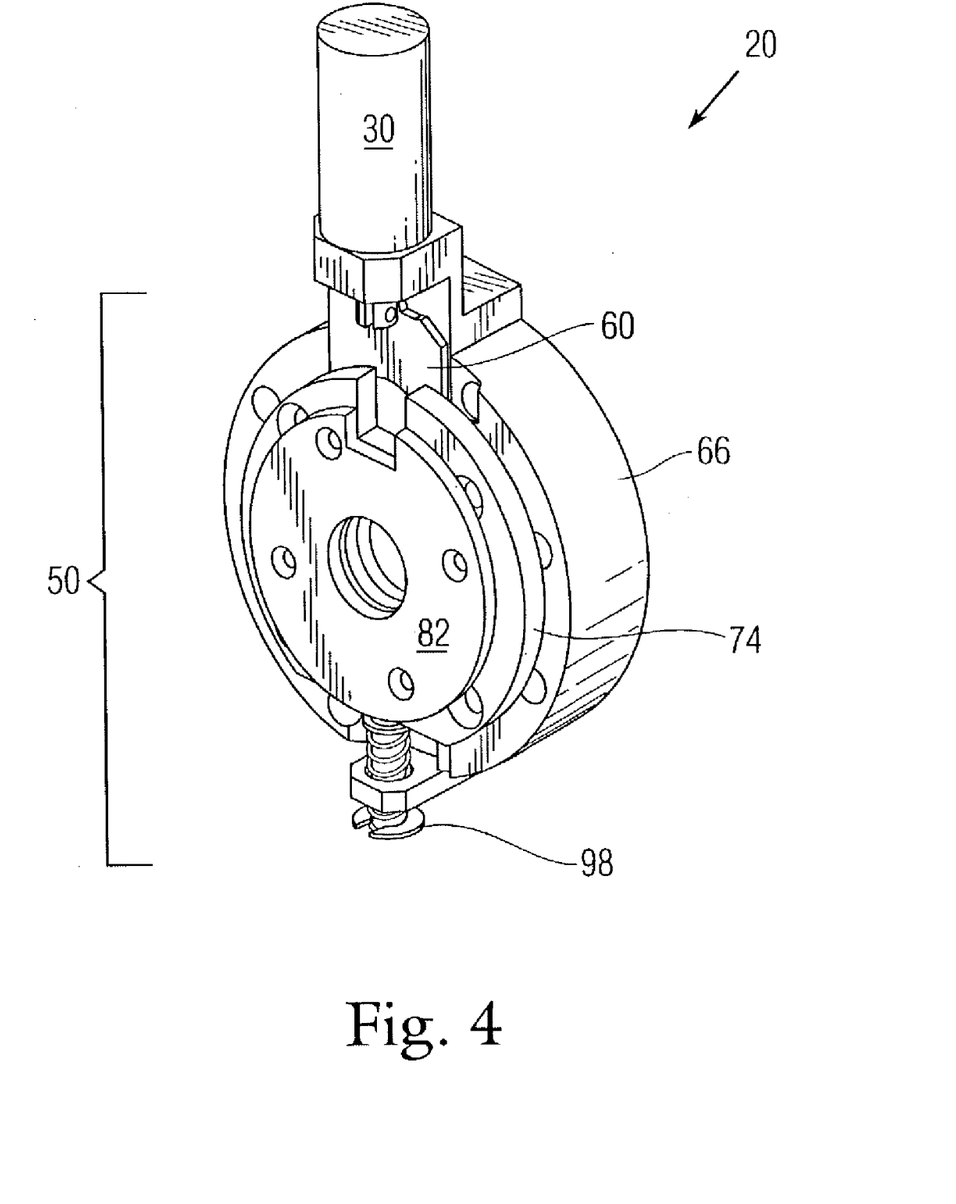
FIG. 4 is a three-quarter front perspective view of a miniature cryogenic shutter assembly 20, according to a first embodiment of the present invention.
Figure 5:
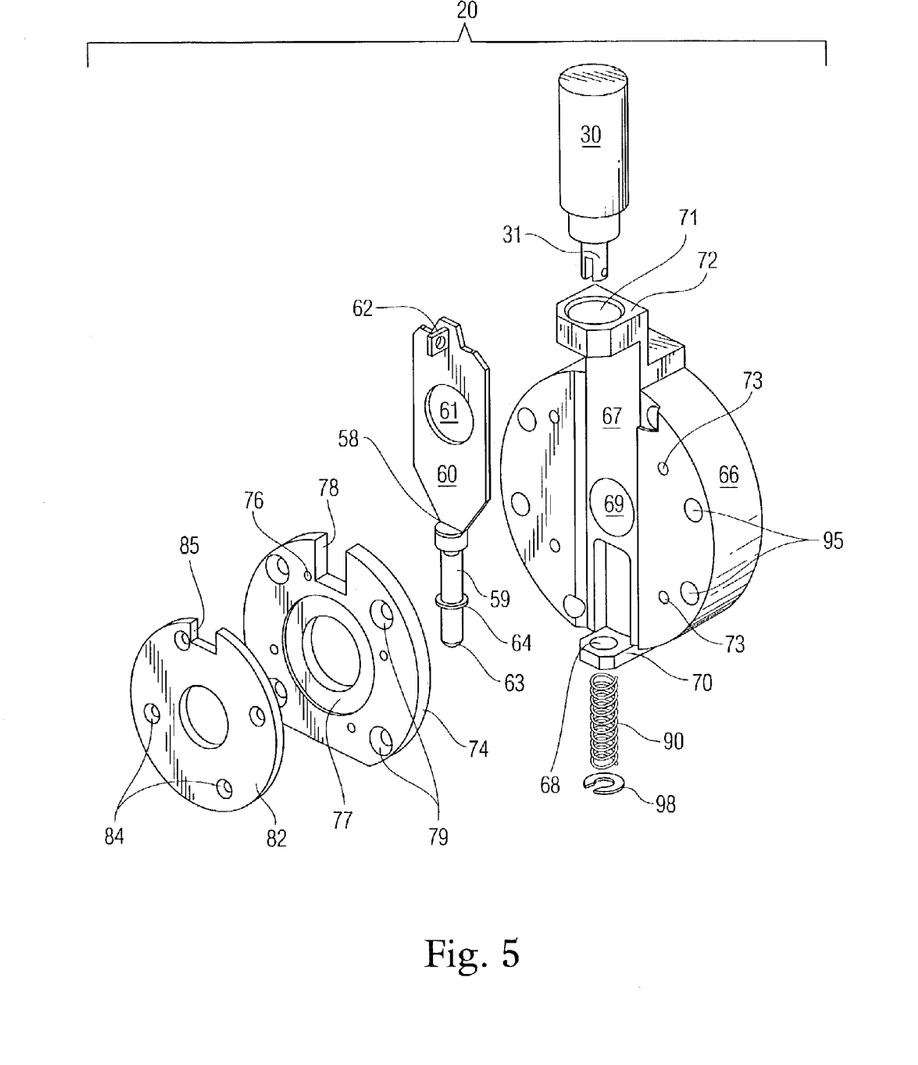
FIG. 5 is a three-quarter exploded view of the miniature cryogenic shutter assembly 20 as in FIG. 4.

FIGS. 4 and 5 are three-quarter front perspective and exploded views, respectively, of a miniature cryogenic shutter assembly 20, according to a first embodiment of the present invention.

The miniature cryogenic shutter assembly 20 generally comprises an actuator 30 and a shutter mechanism 50.

The actuator 30 is preferably a commercially-available, miniature solenoid assembly requiring an actuation signal, or voltage pulse, of between 8–28 VDC. The actuator 30 includes a shaft 31 and operates reliably even when subjected to extreme conditions involving vacuum pressures of <10$^{-6}$ torr and/or temperatures below 90K.

Preferably, the input leads to actuator 30 are controlled via a simple IC so that the voltage pulse is of proper duration (<3 seconds).

With reference to FIGS. 4 and 5, the shutter mechanism 50 (which also operates reliably when subjected to the aforementioned extreme conditions) generally comprises a shutter blade assembly 58, an actuator support plate 66, a filter mounting plate 74, an aperture plate 82, a commercially-available compression spring 90, and a commercially-available retaining ring 98. The actuator support plate 66, filter mounting plate 74, and aperture plate 82 are preferably fabricated of T7072 aluminum Alternatively, these components may be fabricated of ceramic or composite temperature insensitive materials.

The shutter blade assembly 58 includes a counter shaft 59 fixedly attached at one end to a substantially flat shutter blade 60 defined by an aperture 61 that is offset toward one end, and an actuator connection bracket 62 located proximate that same end. The counter shaft 59 is formed with a circumferential groove 63 proximate its opposing distal end and an annular ring 64 near the midpoint of its length. The counter shaft 59 and shutter blade 60 are preferably fabricated of aluminum. Again, these components may also be fabricated of ceramic, composite or other temperature insensitive materials. The surface of the shutter blade 60 that faces toward the infrared imaging system, when positioned to occlude its aperture, is preferably coated with a layer of non-reflective, flat, black paint or like absorptive coating with a high emissivity ($\epsilon$>0.95).

The actuator support plate 66 is a substantially circular plate formed with two, diametrically opposed bosses 70, 72 that define the end points of a groove 67 that extends completely across a face of the plate 66. The support plate also includes a central aperture 69, a plurality of tapped holes 73, and a plurality of counterbored clearance holes 95. The bosses 70, 72 are formed with through holes 68, 71, respectively.

The filter mounting plate 74 is a substantially circular plate formed with a central aperture 75, a recess 77 cut into one of its faces encircling the aperture 75, a plurality of tapped holes 76, a plurality of countersunk clearance holes 79, and a notch 78. The aperture plate 82 is a substantially circular plate formed with a central aperture 83, a plurality of countersunk clearance holes 84, and a notch 85. The notches 78, 85 provide clearance for the movement of the actuator's shaft 31 during the operation (described below) of the overall shutter assembly 20.

To assemble the miniature cryogenic shutter assembly 20, the shutter blade assembly 58 is positioned within the groove 67 formed in the support plate 66 such that its black-painted surface faces the bottom of the groove 67 and the distal end of the counter shaft 59 extends through, and slidably engages, the hole 68 formed in the boss 70 extending from the plate 66. The spring 90 is placed over the section of the shaft 59 protruding through the hole 68 before the retaining ring 98 is snapped into the groove 63 formed proximate the distal end of the counter shaft 59. The spring force present in this configuration serves to align the aperture 61 in the shutter blade 60 with the aperture 69 formed in the center of the support plate 66 by pulling the shaft 59 through the hole 68 until the ring 64 formed in the shaft 59 rests against the inside surface of the boss 70.

The actuator 30 may then be attached to the assembly 20 by inserting its shaft 31 through the hole 71 formed in the other boss 72 extending from the support plate 66 and connecting the distal end of the shaft 31 to the bracket 62 formed on the shutter blade 60. A commercially-available dowel or cotter pin (not shown in the Figures) may be used to establish the required fixed connection.

The filter mounting plate 74 may be affixed to the support plate 66 via fastening means (e.g. a plurality of screws . . . not shown in the Figures) that pass through the countersunk clearance holes 79 and are threaded into the tapped holes 73.

The afore-mentioned bandpass filter (not shown in the Figures) may be placed in the circular recess 77 (formed in the mounting plate 74) before the aperture plate 82 is affixed to the mounting plate 74 via fastening means (e.g. a plurality of screws B not shown in the Figures) that pass through the countersunk clearance holes 84 and are threaded into the tapped holes 76.

When fully assembled, the shutter blade assembly 58 is slidably engaged with groove 67 and held in position between the support plate 66 and the mounting plate 74, and the bandpass filter (when present) is retained within recess 77 between the aperture plate 82 and the mounting plate 74. The counterbored clearance holes 95 formed in the support plate 66 provide the means for affixing the overall assembly 20 to the Dewar cold finger of an infrared camera. When the assembly 20 is at rest (i.e. no actuation signal is acting on the actuator 30), apertures 61, 69, 75, and 83 are aligned.

The cryogenic shutter assembly 20 preferably operates on a voltage pulse of between 8–28 VDC, even when subjected to extreme environments (e.g. vacuums of <$10^{-6}$ torr, temperatures below 90K), and most preferably on a voltage pulse of about 24 VDC. In operation, the aperture 61 of blade 60 is normally aligned with the assembly's other apertures 69, 75, 83 in a non-occluding position. When an appropriate voltage pulse is provided to the actuator 30, this causes the shutter blade assembly 58 to be pulled toward the actuator 30, which in turn moves the black-painted section of the blade 60 to a position that occludes the infrared imaging system's aperture. When the voltage pulse ceases, the spring 90 biases the shutter blade assembly 58 back to its rest position, reopening the imaging system's aperture by realigning the blade's aperture 61 with the assembly's other apertures 69, 75, 83.

As is readily perceived in the foregoing description, the present invention's design is simple and straightforward, and can be economically manufactured. The present invention is compact enough to fit small/medium-sized infrared imaging systems and is designed to operate in a vacuum and at extremely low temperatures (e.g. interplanetary space). The mechanism of the present invention may be used for other imaging system-related functions such as switching between two or more lenses, optical filters, and/or prisms. The present invention is fabricated of a variety of strong, lightweight materials to provide the durability/longevity required by the nature of its usage.

Having now fully set forth the preferred embodiment and certain modifications of the concept underlying the present invention, various other embodiments (e.g. a rotational actuatorin place of the linearly-operating actuator 30, a second actuator in place of the spring 90) as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A cryogenic shutter assembly comprising:

a first plate, said first plate including a first boss formed with a through hole and located along an edge of said first plate, a second boss formed with a through hole and located along an edge of said first plate, the position of said second boss being diametrically opposed to said first boss, and a groove formed in a face of said first plate with a first end of said groove terminating at said first boss and a second end of said groove terminating at said second boss, and a central aperture;

a shutter blade assembly, said blade assembly including a shutter blade formed with an aperture offset toward a first end, said shutter blade being slidably engaged with said groove in said first plate, a bracket fixedly attached to said shutter blade at said first end, and a shaft fixedly attached to said shutter blade at a second end, said shaft being slidably engaged with said hole formed in said first boss;

an actuator detachably attached to said second boss, said actuator including a shaft, said shaft extending through said hole in said second boss and being detachably attached to said bracket on said shutter blade;

a second plate detachably attached to said first plate, said second plate comprising, a central aperture, said central aperture being aligned with said aperture in said first plate a recess formed in a face of said second plate encircling said central aperture, and a notch formed along an edge of said second plate;

a third plate detachably attached to said second plate, said third plate including a central aperture, said central aperture being aligned with said apertures in said first and second plates, and a notch formed along an edge of said third plate, said notch being aligned with said notch in said second plate; and a spring encircling a distal end of said shaft affixed to said shutter blade and serving to bias said shutter blade toward said first end of said groove such that said aperture in said shutter blade is aligned with said apertures in said first, second, and third plates;

wherein actuation of said actuator serves to eliminate said alignment of said aperture in said shutter blade with said apertures in said first, second, and third plates by biasing said shutter blade toward said second end of said groove.

\* \* \* \* \*